(12) United States Patent
Chung

(10) Patent No.: US 11,013,369 B2
(45) Date of Patent: May 25, 2021

(54) COLLAPSIBLE STAND FOR A BARBECUE GRILL

(71) Applicant: Kiosky Chung, Taichung (TW)

(72) Inventor: Kiosky Chung, Taichung (TW)

(*) Notice: Subject to any disclaimer, the term of this patent is extended or adjusted under 35 U.S.C. 154(b) by 213 days.

(21) Appl. No.: 16/276,573

(22) Filed: Feb. 14, 2019

(65) Prior Publication Data
US 2020/0260910 A1    Aug. 20, 2020

(51) Int. Cl.
*A47J 37/07* (2006.01)
*F24B 1/20* (2006.01)

(52) U.S. Cl.
CPC ........... *A47J 37/0763* (2013.01); *F24B 1/205* (2013.01); *A47J 2037/0777* (2013.01)

(58) Field of Classification Search
CPC ........... A47J 37/0763; A47J 2037/0777; F24B 1/205; A47B 2003/0824; A47B 3/0818; A47B 2003/0827; A47B 2003/0821; A47B 3/0809; A47B 3/0812; A47B 3/0815; A47B 3/08; F16M 11/16
See application file for complete search history.

(56) References Cited

U.S. PATENT DOCUMENTS

| | | | | |
|---|---|---|---|---|
| 2,769,650 A * | 11/1956 | Larson | ................ | A47B 3/0818 403/61 |
| 2,785,936 A * | 3/1957 | Joseph | ................ | A47B 3/0911 108/132 |
| 6,257,229 B1 * | 7/2001 | Stewart | ................ | A47J 37/0786 126/276 |
| 7,503,267 B1 * | 3/2009 | Zemel | ................ | A47B 3/08 108/115 |
| 8,627,550 B1 * | 1/2014 | Chung | ................ | A47J 37/0786 16/422 |
| 2002/0166929 A1 * | 11/2002 | Pai | ................ | F16M 11/38 248/127 |
| 2005/0279341 A1 * | 12/2005 | Chung | ................ | A47J 37/0704 126/9 R |
| 2007/0089724 A1 * | 4/2007 | Home | ................ | A47J 37/0704 126/9 R |
| 2009/0183726 A1 * | 7/2009 | Chung | ................ | A47J 37/0704 126/25 R |
| 2012/0017890 A1 * | 1/2012 | May | ................ | A47J 37/0704 126/9 R |
| 2015/0150415 A1 * | 6/2015 | Chung | ................ | A47J 37/0763 126/25 R |
| 2020/0260910 A1 * | 8/2020 | Chung | ................ | F24B 1/205 |

* cited by examiner

*Primary Examiner* — Christopher Garft
(74) *Attorney, Agent, or Firm* — Bruce Stone LLP; Joseph A. Bruce

(57) ABSTRACT

A collapsible stand includes a box, four connectors, two left legs, two right legs, two left levers, two right levers and rod. The connectors are connected to the box. The legs are pivotally connected to the connectors. Each left leg is located between one right leg and the box when the collapsible stand is in a collapsed position. Each left lever includes an end pivotally connected to a left leg. Another end of one left lever includes a straight slit. Each right lever includes an end pivotally connected to one right leg. Another end of one right lever includes a slot. A transverse tongue of the rod is movable along the slot. The levers are kept in an extended position when the tongue is inserted in the straight slit. The levers are kept in a collapsed position when the tongue is inserted in the arched slit.

17 Claims, 15 Drawing Sheets

COLLAPSIBLE STAND FOR A BARBECUE GRILL

BACKGROUND OF INVENTION

1. Field of Invention

The present invention relates to a barbecue grill and, more particularly, to a collapsible stand or cart for a barbecue grill.

2. Related Prior Art

Referring to FIG. 15, a conventional barbecue grill 90 includes a box 92, four legs 94 and a board 96. The legs 94 are connected to a lower portion of the box 92. The board 96 is located between and supported on the legs 94. However, the barbecue grill 90 is bulky because it is not collapsible, i.e., the legs 94 cannot be pivoted related to the board 96 and the box 92.

The present invention is therefore intended to obviate or at least alleviate the problems encountered in prior art.

SUMMARY OF INVENTION

It is the primary objective of the present invention to provide a barbecue grill with a collapsible stand.

To achieve the foregoing objective, the collapsible stand includes a box, four connectors, two left legs, two right legs, two left levers, two right levers and rod. The connectors are connected to the box. The legs are pivotally connected to the connectors. Each left leg is located between one right leg and the box when the collapsible stand is in a collapsed position. Each left lever includes an end connected to a left leg pivotally. Another end of one left lever includes a straight slit. Each right lever includes an end connected to one right leg pivotally. Another end of one right lever includes a slot. A transverse tongue of the rod is movable along the slot. The levers are kept in an extended position when the tongue is inserted in the straight slit. The levers are kept in a collapsed position when the tongue is inserted in the arched slit.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
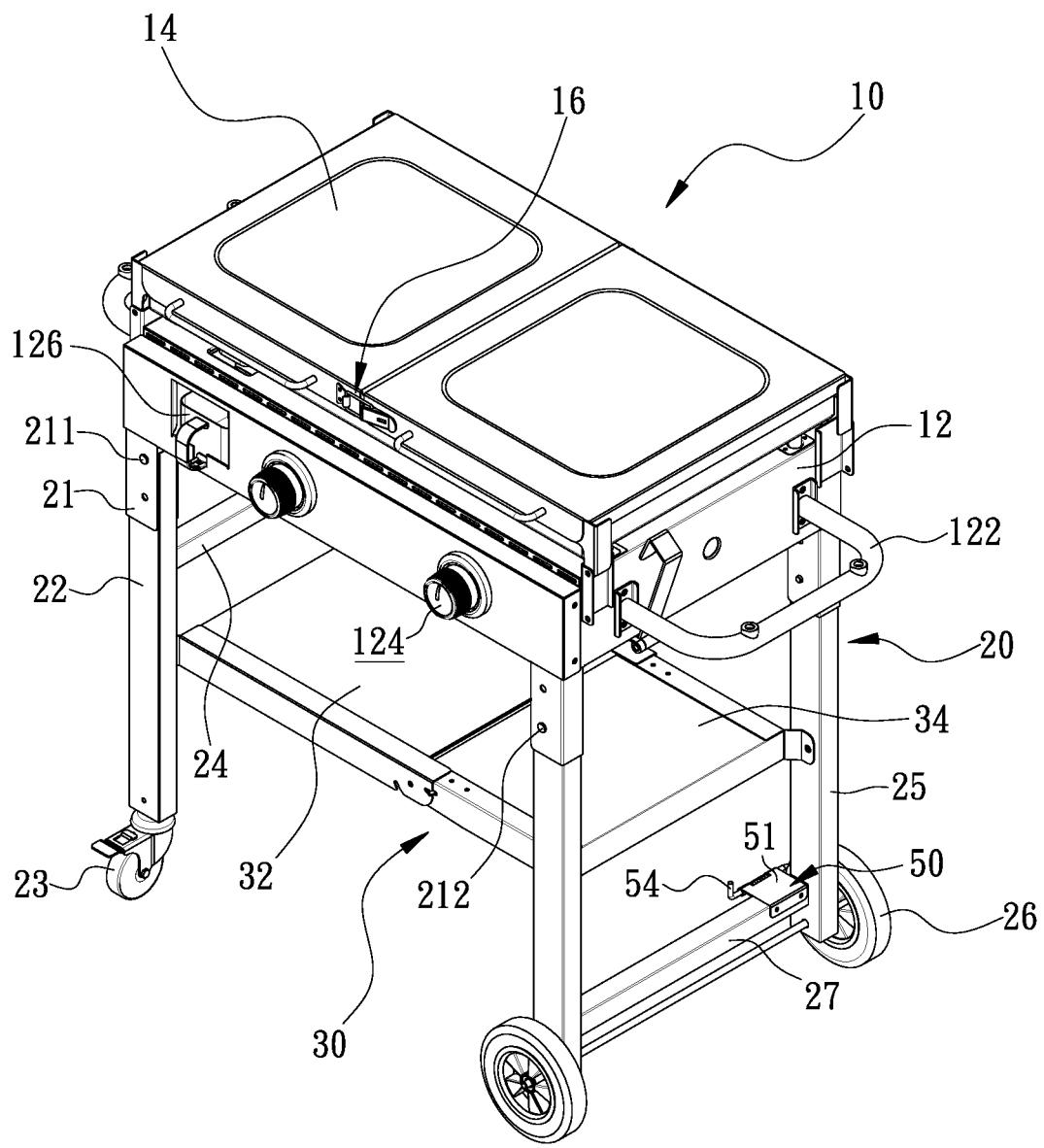
FIG. 1 is a perspective view of a barbecue grill with a collapsible stand according to the preferred embodiment of the present invention.

Referring to FIG. 1, a barbecue grill 10 includes two covers 14, a buckle 16 and a collapsible stand 20 according to the preferred embodiment of the present invention. The collapsible stand 20 includes a box 12. The covers 14 are pivotally connected to the box 12. The buckle 16 is operable to lock the covers 14 to each other.

The box 12 includes two lateral panels located between and connected to a front panel and a rear panel. The box 12 includes two handles 122 each of which is connected to a corresponding one of the lateral panel. The barbecue grill 10 further includes knobs 124 and a drawer 126. The knobs 124 are operable to control flames. The drawer 126 is used to contain parts of the barbecue grill 10 and/or seasoning.

The collapsible stand 20 further includes connectors 21, two left legs 22, two right legs 25, a linking device 30, two lock devices 40 and a latch device 50. The connectors 21 are connected to a lower portion of the box 12 by welding for example. Each of the connectors 21 is a U-shaped element that it includes an open side. For briefness and clarity, two of the connectors 21 will be referred to as the 'left connectors' and the remaining connectors 21 will be referred to as the 'right connectors' in the following description. The open sides of the left connectors 21 face the open sides of the right connectors 21.

Each of the left legs 22 is pivotally connected to one of the left connectors 21 by a pivot 211 in the form of a rivet for example. Each of the right legs 25 is pivotally connected to one of the right connectors 21 by a pivot 212 in the form of a rivet for example. The pivot 211 is located higher (or closer to the lower portion of the box 12) than the pivot 212 for reasons to be given.

Preferably, a crossbar 24 is located between and connected to the left legs 22 so that the left legs 22 are movable together. Similarly, a crossbar 27 is located between and connected to the right legs 25 so that the right legs 25 are movable together. A caster 23 is connected to a lower end of each of the right legs 25. A wheel 26 is connected to a lower end of each of the right legs 25. Thus, the collapsible stand can be used as a cart to move the barbecue grill 10.

Figure 2:
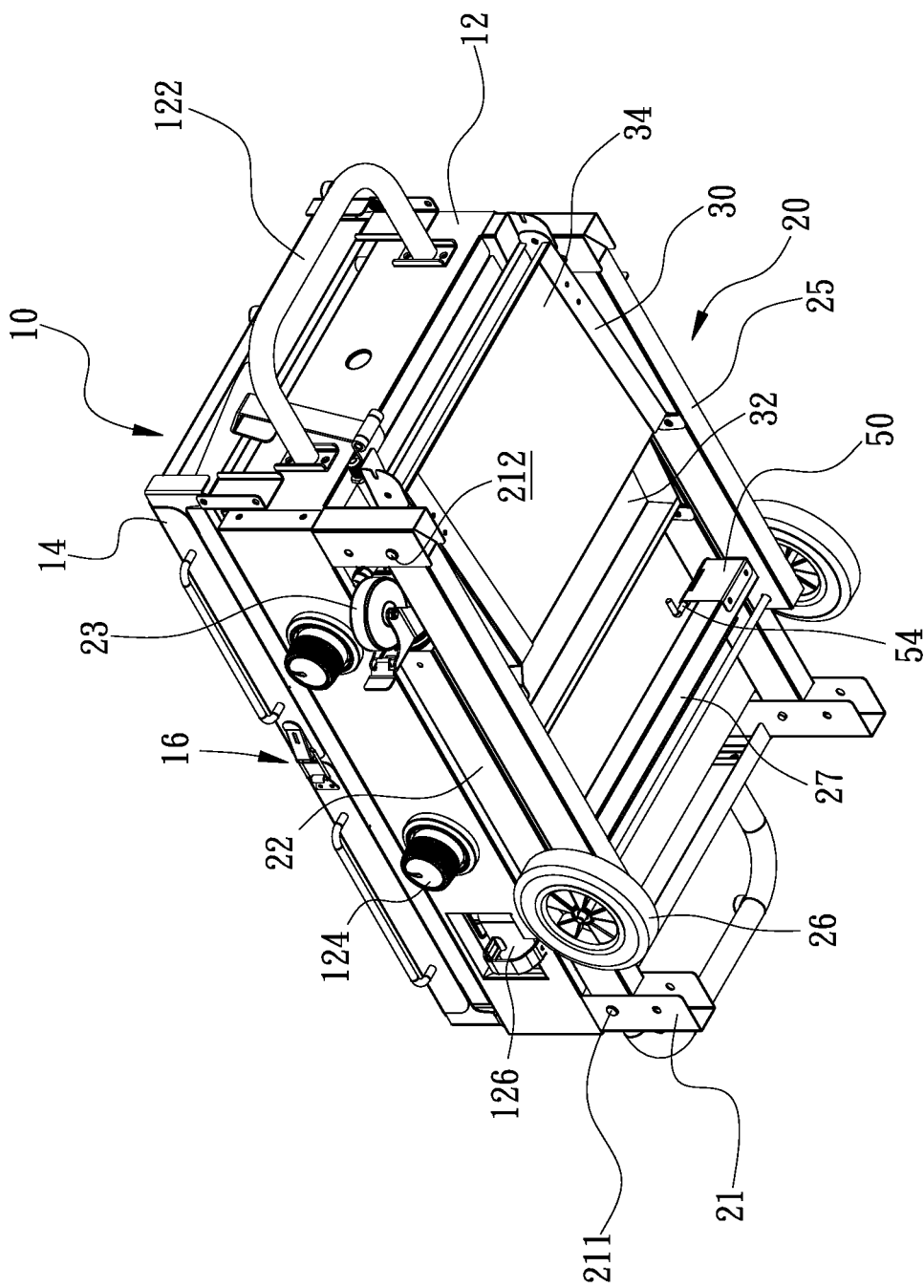
FIG. 2 is a perspective view of the collapsible stand in a collapsed position other than an expanded position shown in FIG. 1.

The collapsible stand 20 can be moved to a collapsed position shown in FIG. 2 from an extended position shown in FIG. 1. The barbecue grill 10 occupies a smaller space in the collapsed position than the extended position. Thus, in the collapsed position, the barbecue grill 10 can easily be stored and moved.

To move collapsible stand 20 to the collapsed position from the extended position, the left legs 22 are pivoted about the pivots 211 toward the lower portion of the box 12. Then, the right legs 25 are pivoted about the pivots 212 toward the left legs 22. As mentioned above, the pivot 211 is located higher (or closer to the lower portion of the box 12) than the pivot 212 so that the left legs 22 are located between the lower portion of the box 12 and the right legs 25 when the collapsible stand 20 is in the collapsed position.

Figure 3:
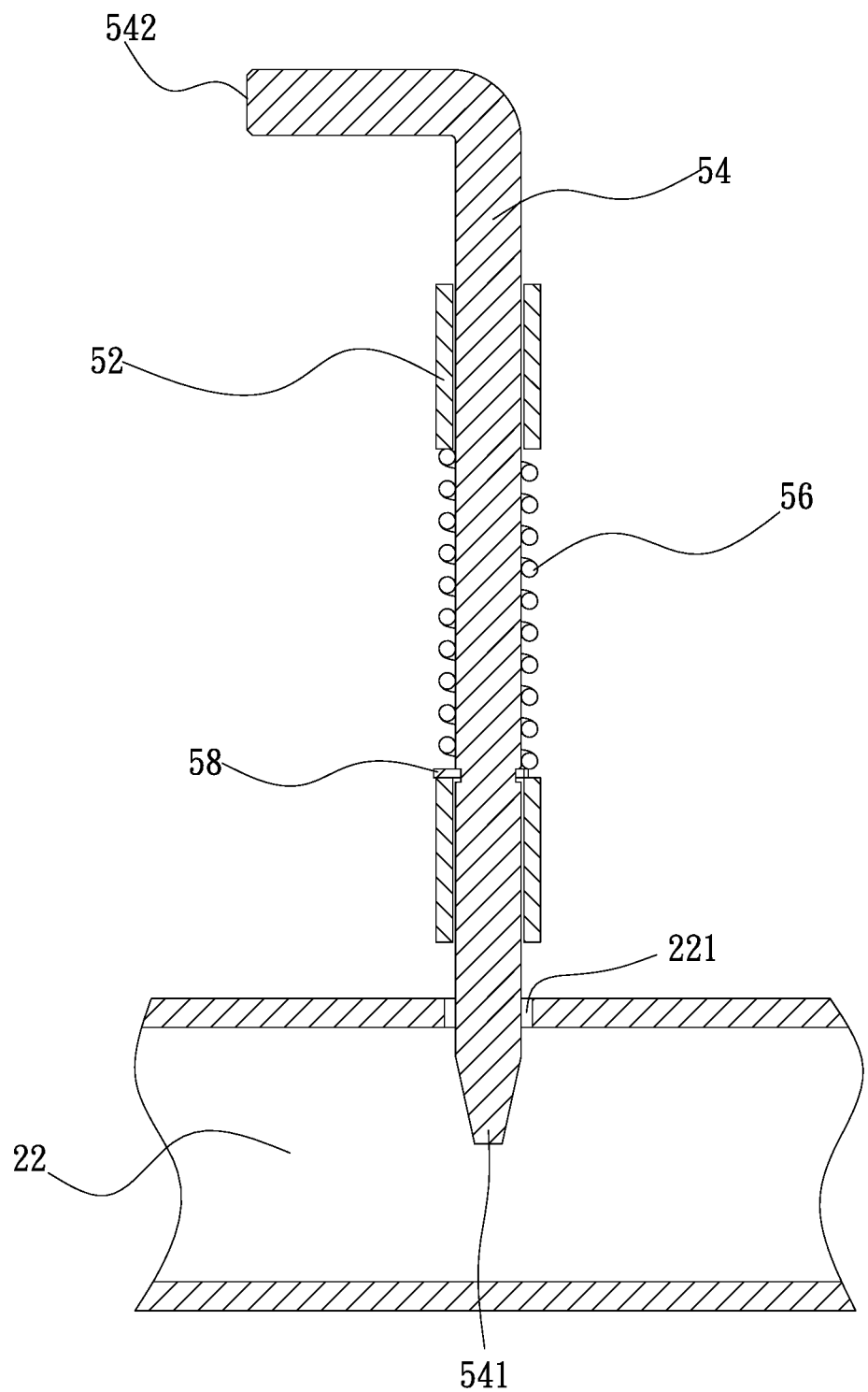
FIG. 3 is a cross-sectional view of a first locking device of the collapsible stand shown in FIG. 1.

Referring to FIGS. 2 and 3, the latch device 50 includes a plate 51, two loops 52, a pin 54, a spring 56 and a clip 58. The plate 51 is connected to the crossbar 27 by welding for example. The loops 52 are formed at an edge of the plate 51. The loops 52 and the plate 51 are made in one piece. The pin 54 includes an insert 541 formed at an end and a handle 542 formed at another end. The insert 541 is a tapered section of the pin 54. The handle 542 is bent section of the pin 54. The spring 56 is located between the loops 52. The pin 54 is inserted in the loops 52 and the spring 56. Thus, the loops 52 are located between the insert 541 and the handle 542. The clip 58 includes an internal edge inserted in an annular groove (not numbered) in the pin 54 so that the clip 58 is movable with the pin 54. The spring 56 is compressed between the clip 58 and one of the loops 52 (the 'supporting loop'), thereby biasing the insert 541 out of the remaining loop 52 (the 'guiding loop'). The handle 542 is operable to move the pin 54 so that the insert 541 is moved toward the guiding loop 52.

The insert 541 is inserted in an aperture 221 in one of the left legs 22 and the entire latch device 50 is connected to the crossbar 27, which is connected to the right legs 25. Thus, the left legs 22 are locked to the right legs 25 by the latch device 50. The spring 56 keeps the insert 541 in the aperture 221, thereby locking the left legs 22 to the right legs 25, thereby keeping the collapsible stand 20 in the collapsed position.

Figure 4:
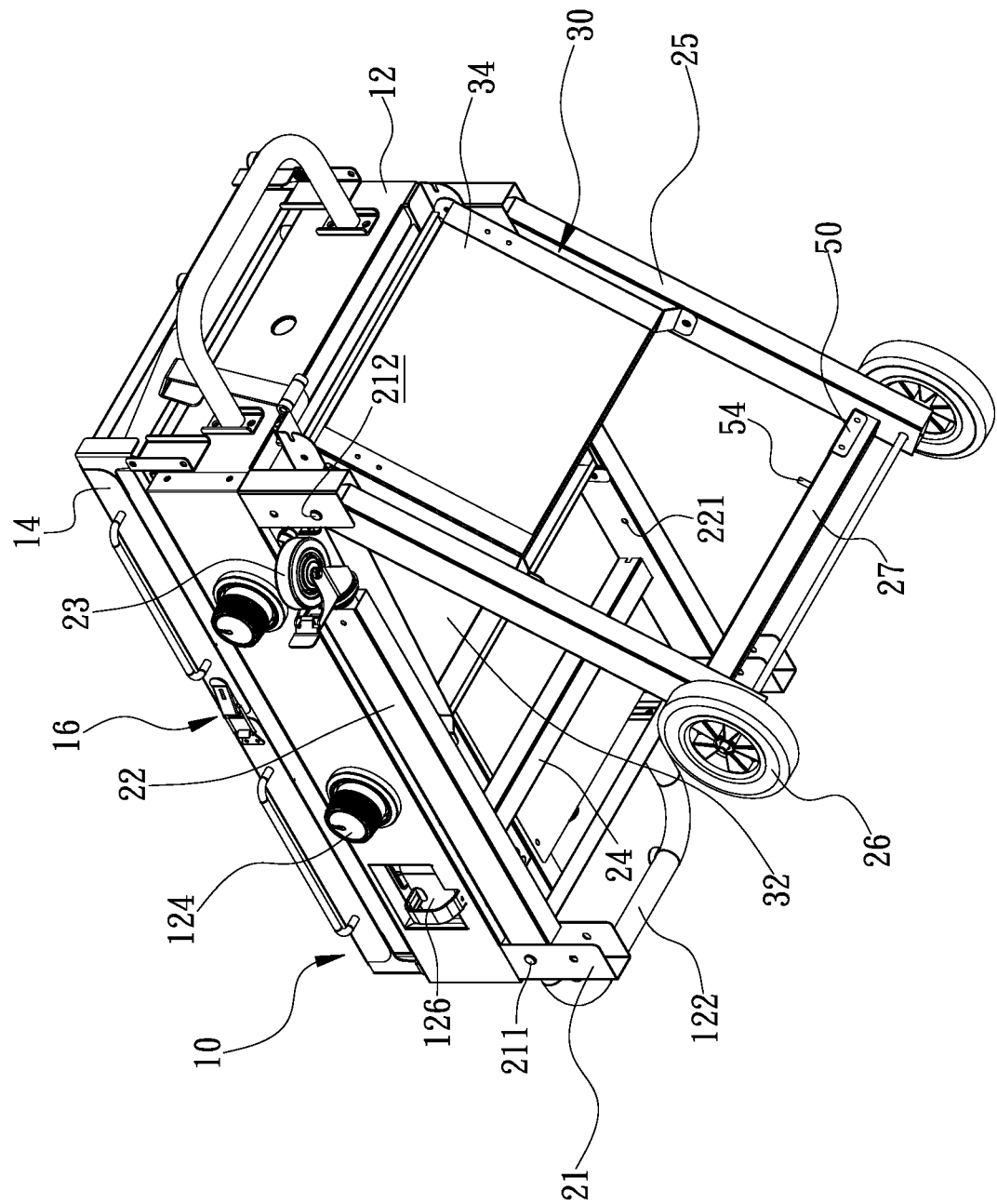
FIG. 4 is a perspective view of the collapsible stand in another position than the collapsed position shown in FIG. 2.

As mentioned above, the handle 542 is operable to move the pin 54 so that the insert 541 is moved toward the guiding loop 52. Thus, the insert 541 is moved out of the aperture 221, thereby releasing the left legs 22 from the right legs 25, thereby allowing the left legs 22 to pivot relative to the right legs 25 referring to FIG. 4.

Figure 5:
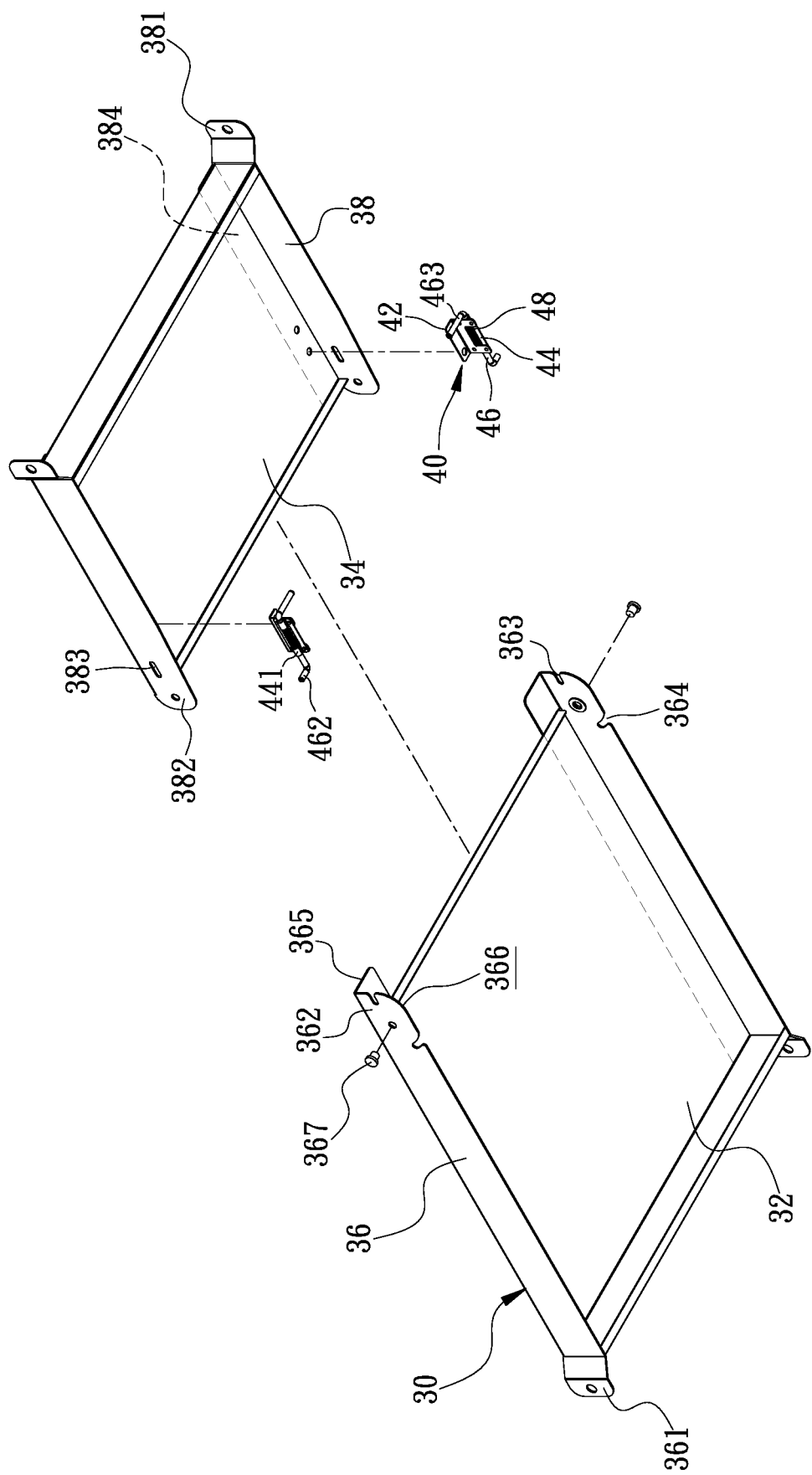
FIG. 5 is an exploded view of a linking device of the collapsible stand shown in FIG. 1.

Referring to FIG. 5, the linking device 30 includes a left board 32, a right board 34, two left levers 36 and two right levers 38. The left board 32 can be connected to the left levers 36 or they can be formed in one piece. The right board 34 can be connected to the right levers 38 or they can be formed in one piece.

Each of the left levers 36 includes a pivotal end 361, an engagement end 362, a straight slit 363, an arched slit 364 and a restraining portion 365. The pivotal end 361 and the engagement end 362 are located opposite to each other. The straight slit 363 and the arched slit 364 are made in an end 366 of the engagement end 362. The restraining portions 365 of the left levers 36 extend toward each other.

Each of the right levers 38 includes a pivotal end 381, a connective end 382, a slot 383 and a contact portion 384. The pivotal end 381 and the connective end 382 are located opposite to each other. The contact portions 384 of the right levers 38 extend toward each other.

The pivotal end 361 of each of the left levers 36 is pivotally connected to one of the left legs 22. The pivotal end 381 of each of the right levers 38 is pivotally connected to one of the right legs 25. The engagement end 362 of each of the left levers 36 is pivotally connected to the connective end 382 of one of the right levers 38 by a pivot 367. Thus, the linking device 30 is moved between an extended position and a collapsed position as the collapsible the left legs 22 and the right legs 25 are moved between the extended position and the collapsed position.

Figure 6:
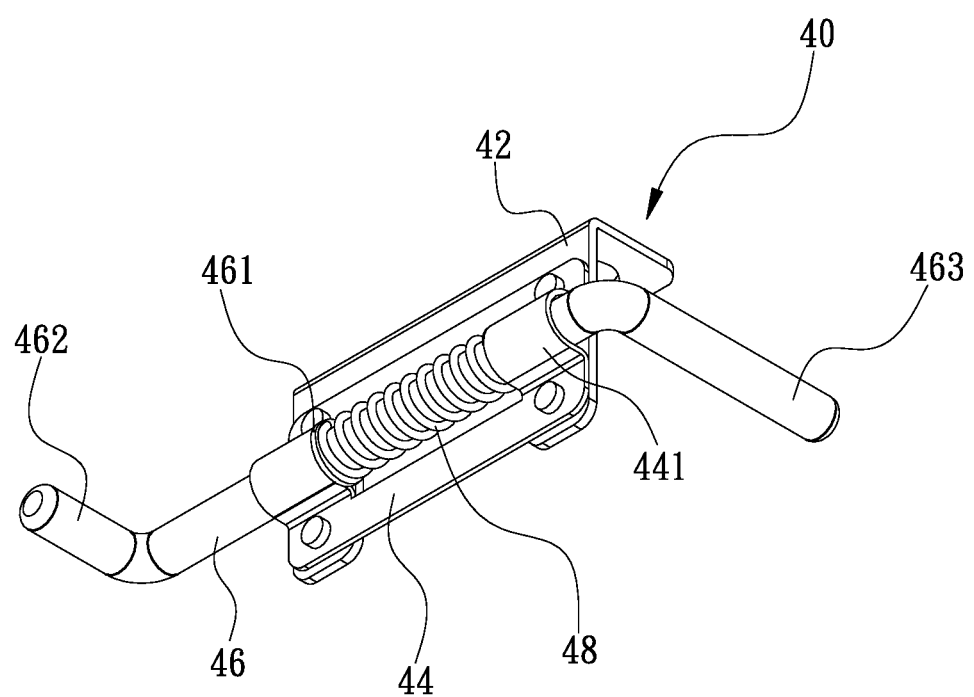
FIG. 6 is a perspective view of a second locking device of the collapsible stand shown in FIG. 1.

Referring to FIG. 6, each of the lock devices 40 includes a primary plate 42, a secondary plate 44, a rod 46 and a spring 48. The rod 46 includes tongue 462 transversely extending from an end and a handle 463 transversely extending from another end.

The primary plate 42 is connected to a proper portion of the board 34 and/or the contact portion 384 of one of the right levers 38. Thus, the right board 34 and the corresponding right lever 38 both cover the primary plate 42. The secondary plate 44 includes two separated arched portions 441 connected to a face of the primary plate 42 by rivets for example. The spring 48 is located between the arched portions 441 of the secondary plate 44. The rod 46 includes a middle section inserted in the spring 48. The spring 56 is compressed between an annular rib 461 formed on the rod 46 and one of the arched portions 441 (the 'supporting arched portion'), thereby biasing the tongue 462 from the remaining arched portion 441 (the 'guiding arched portion'). The tongue 462 extends to an external side of the corresponding right lever 38 from an internal side of the same through the slot 383.

Figure 7:
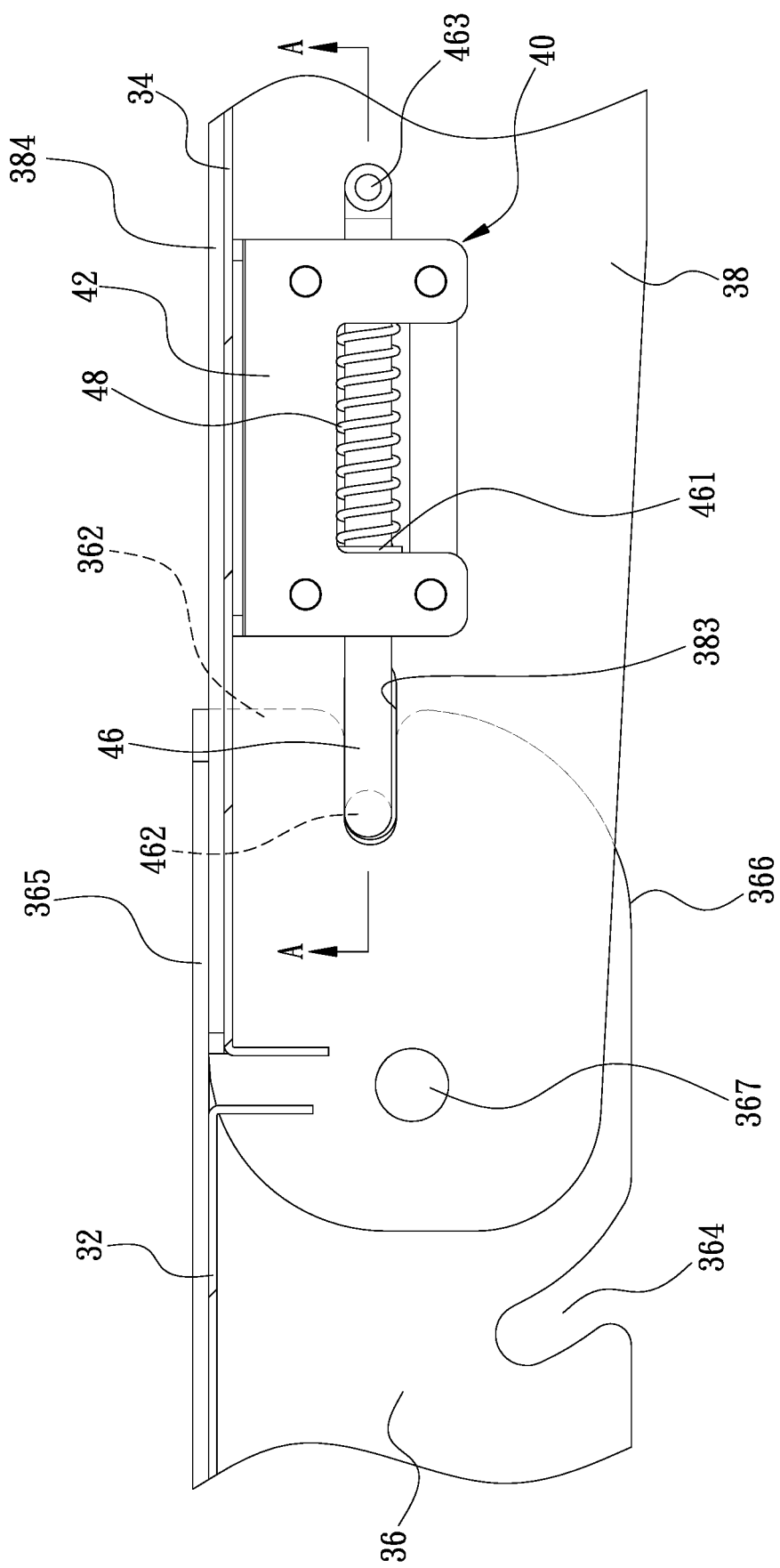
FIG. 7 is an enlarged, partial, side view of the collapsible stand shown in FIG. 1.
Figure 8:
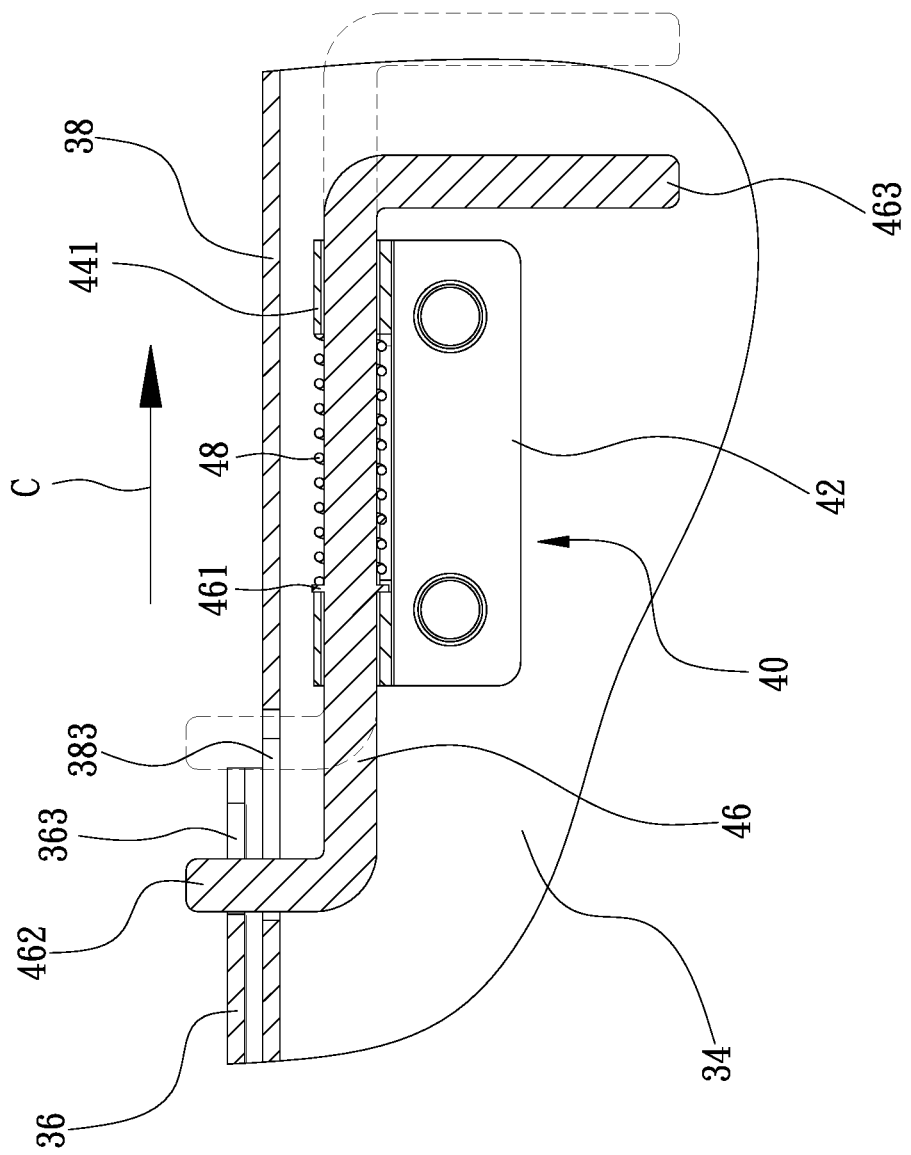
FIG. 8 is a cross-sectional view of the collapsible stand of FIG. 7.

Referring to FIGS. 7 and 8, the tongue 462 is inserted and kept in the straight slit 363 as the spring 56 is compressed between the annular rib 461 and the supporting arched portion 441. Thus, the left levers 36 cannot be pivoted relative to the right levers 38, i.e., the linking device 30 is kept in the extended position. Accordingly, the collapsible stand 20 is kept in the extended position. The restraining portions 365 of the left levers 36 abut against the contact portions 384 of the right levers 38, thereby avoiding over-pivoting of the left levers 36 relative to the right levers 38.

Figure 10:
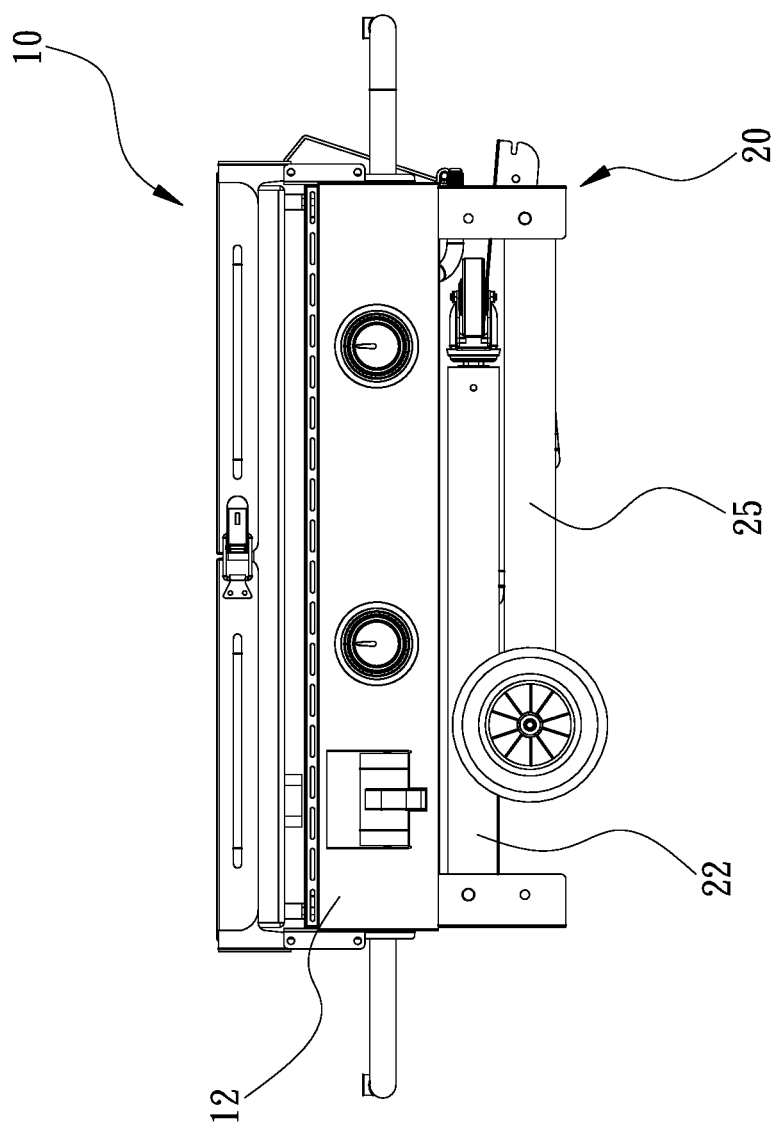
FIG. 10 is a side view of the collapsible stand shown in FIG. 2.
Figure 11:
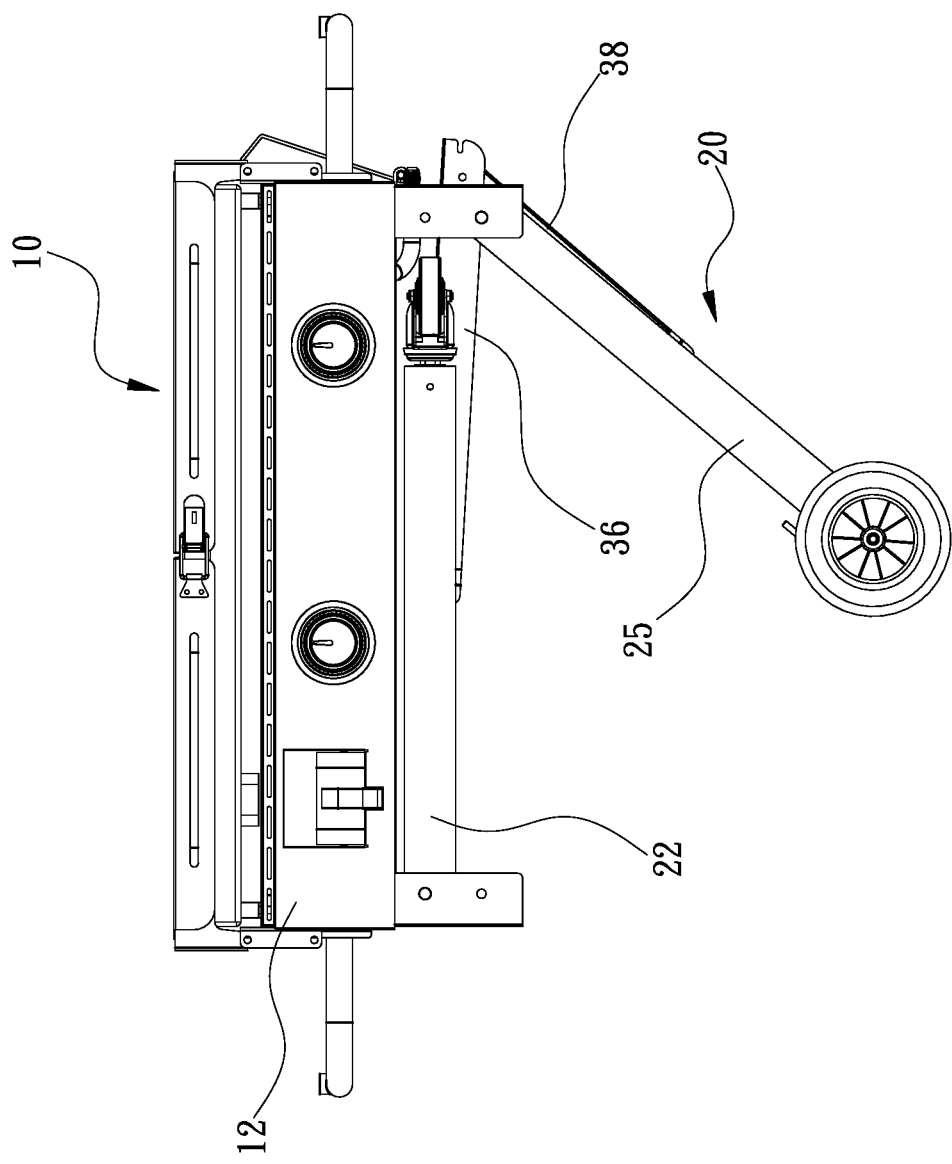
FIG. 11 is a cross-sectional view of the collapsible stand in another position than shown in FIG. 10.
Figure 13:
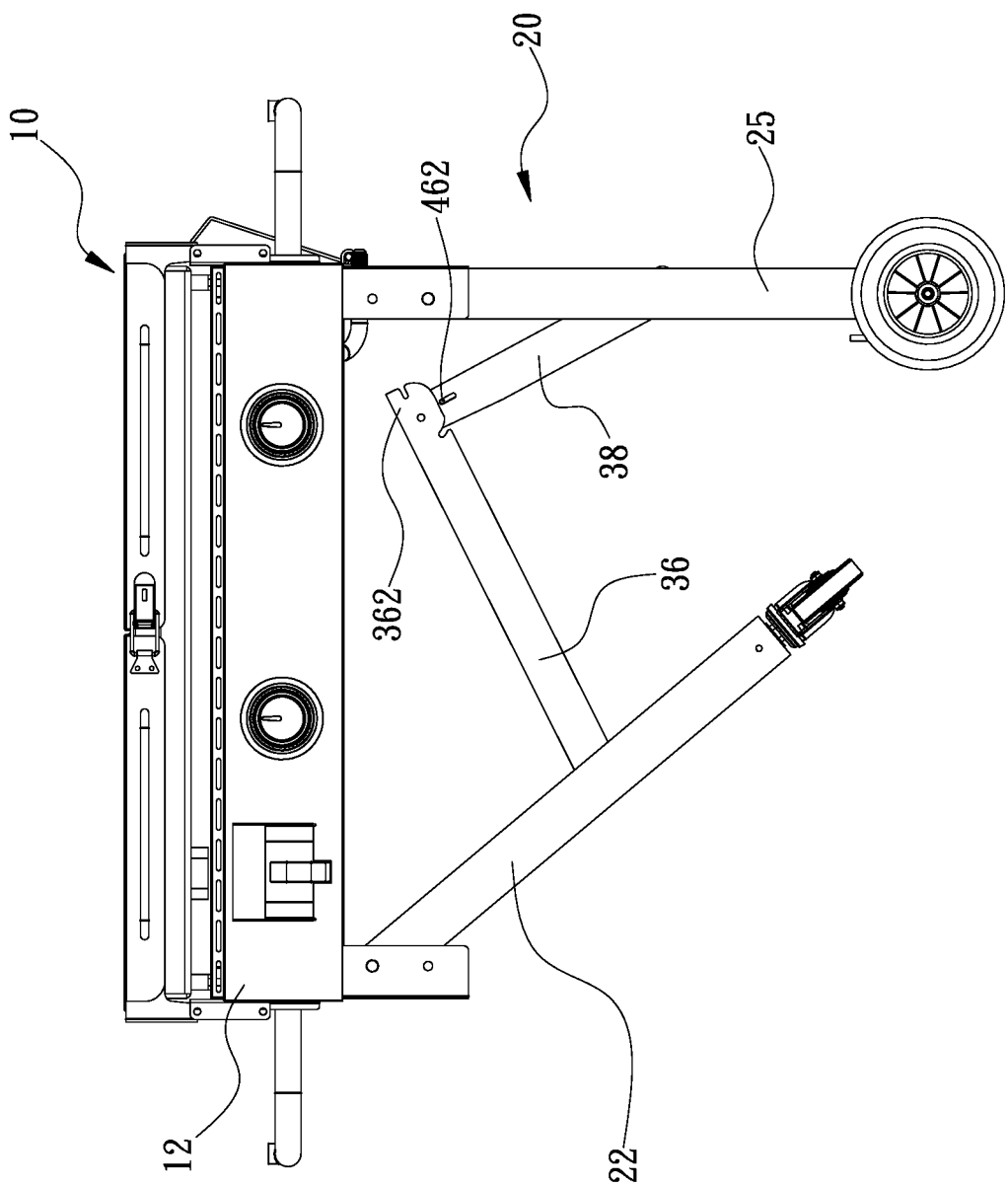
FIG. 13 is a cross-sectional view of the collapsible stand in another position than shown in FIG. 12.
Figure 14:
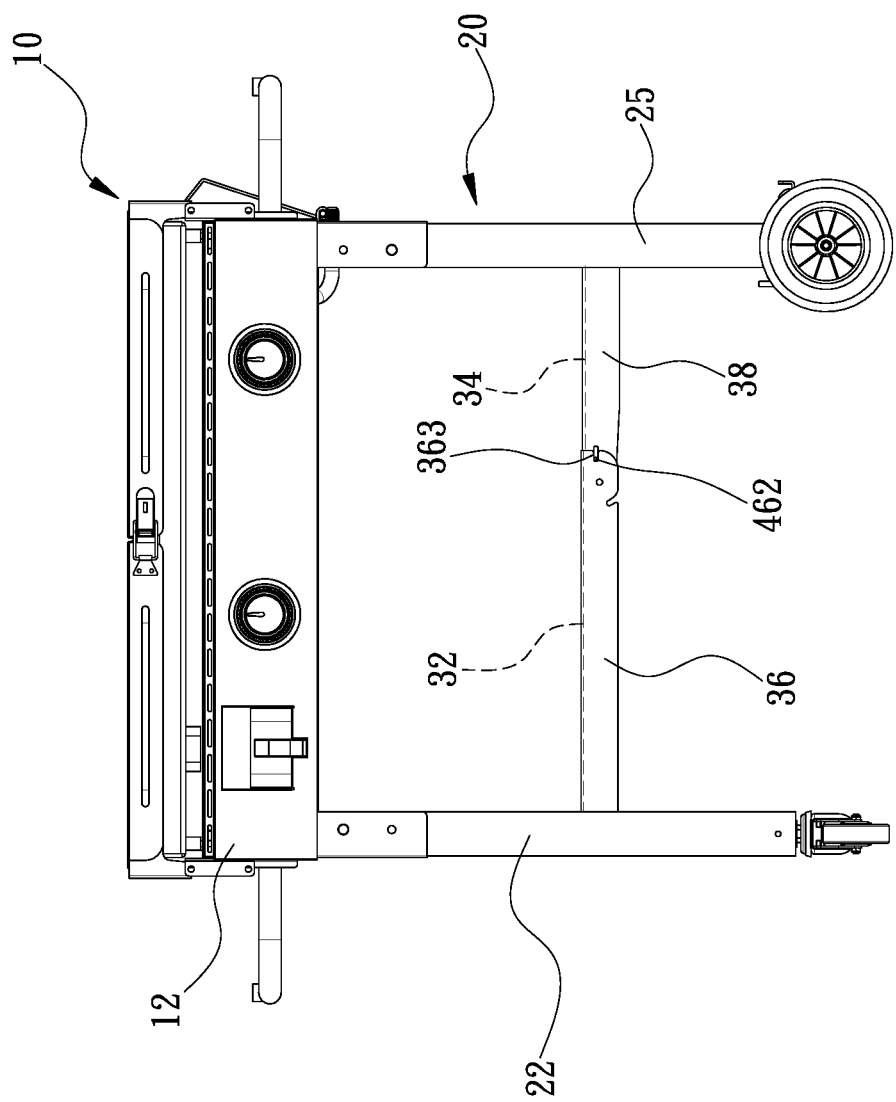
FIG. 14 is a cross-sectional view of the collapsible stand in another position than shown in FIG. 13.
Figure 15:
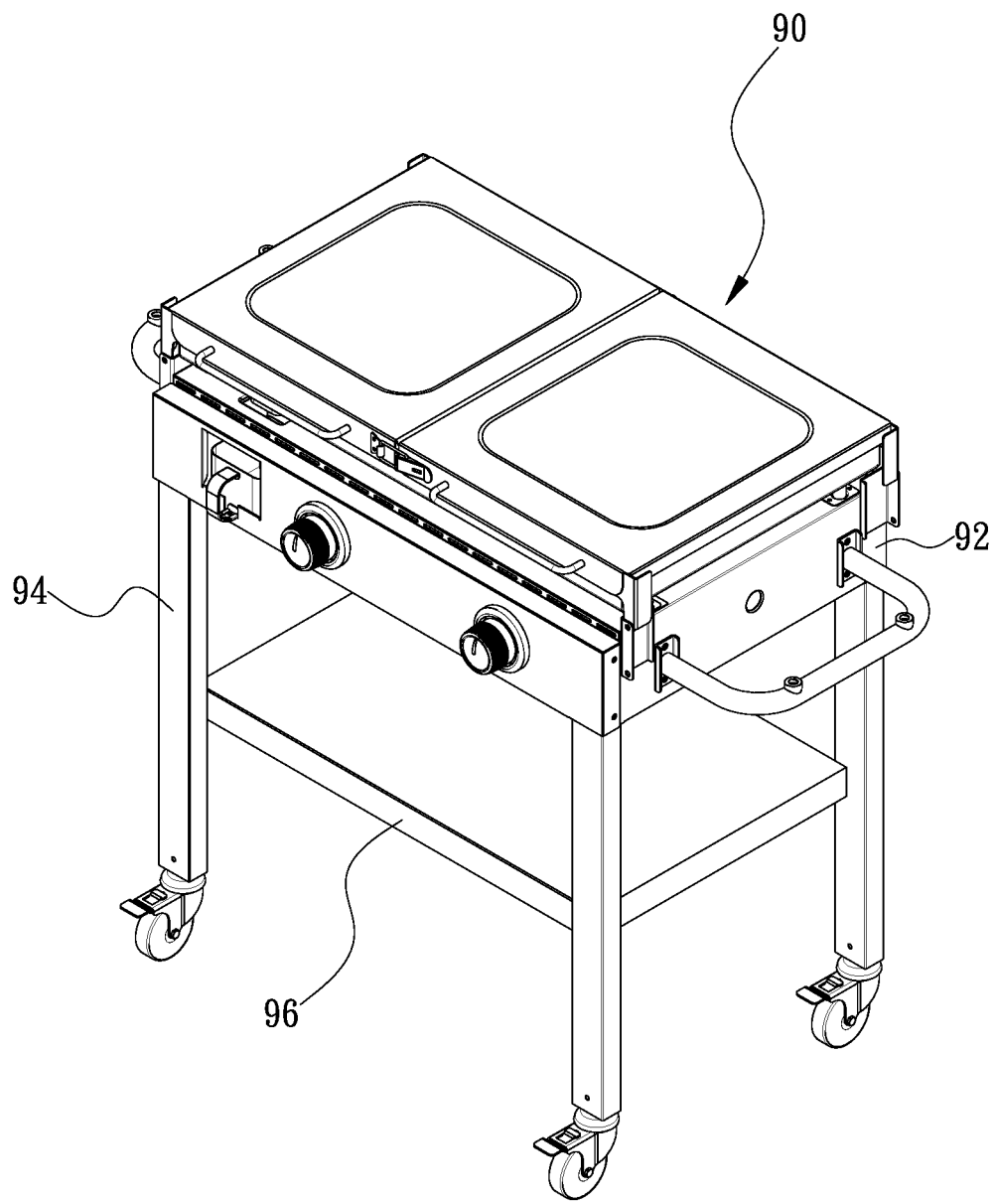
FIG. 15 is a perspective view of a conventional barbecue grill.

The handle 463 is operable to move the tongue 462 toward the guiding arched portion 441, thereby moving the tongue 462 out of the straight slit 363. Thus, the left levers 36 can be pivoted relative to the right levers 38, i.e., the linking device 30 can be moved to the collapsed position shown in FIG. 9 from the extended position shown in FIG. 7. Accordingly, the collapsible stand 20 can be moved to the collapsed position shown in FIG. 10 from the extended position shown in FIG. 14 via other positions shown in FIGS. 13 to 11 sequentially. In this movement, the tongue 462 is moved into the arched slit 364 via and along the edge 366. Thus, the left levers 36 cannot be pivoted relative to the right levers 38, i.e., the linking device 30 is kept in the collapsed position, and so is the collapsible stand 20.

Figure 9:
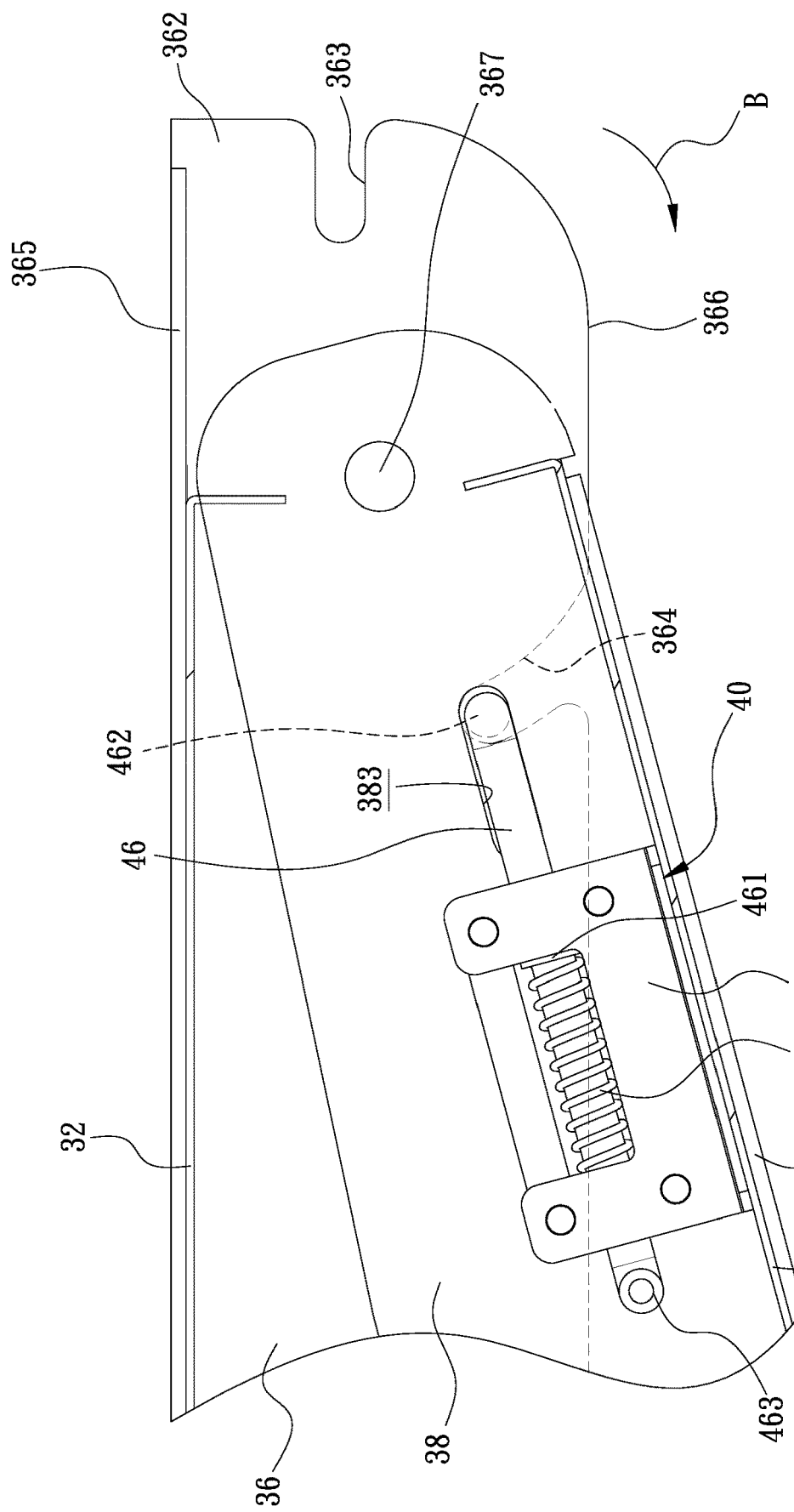
FIG. 9 is an enlarged, partial, side view of the collapsible stand in another position than shown in FIG. 7.
Figure 12:
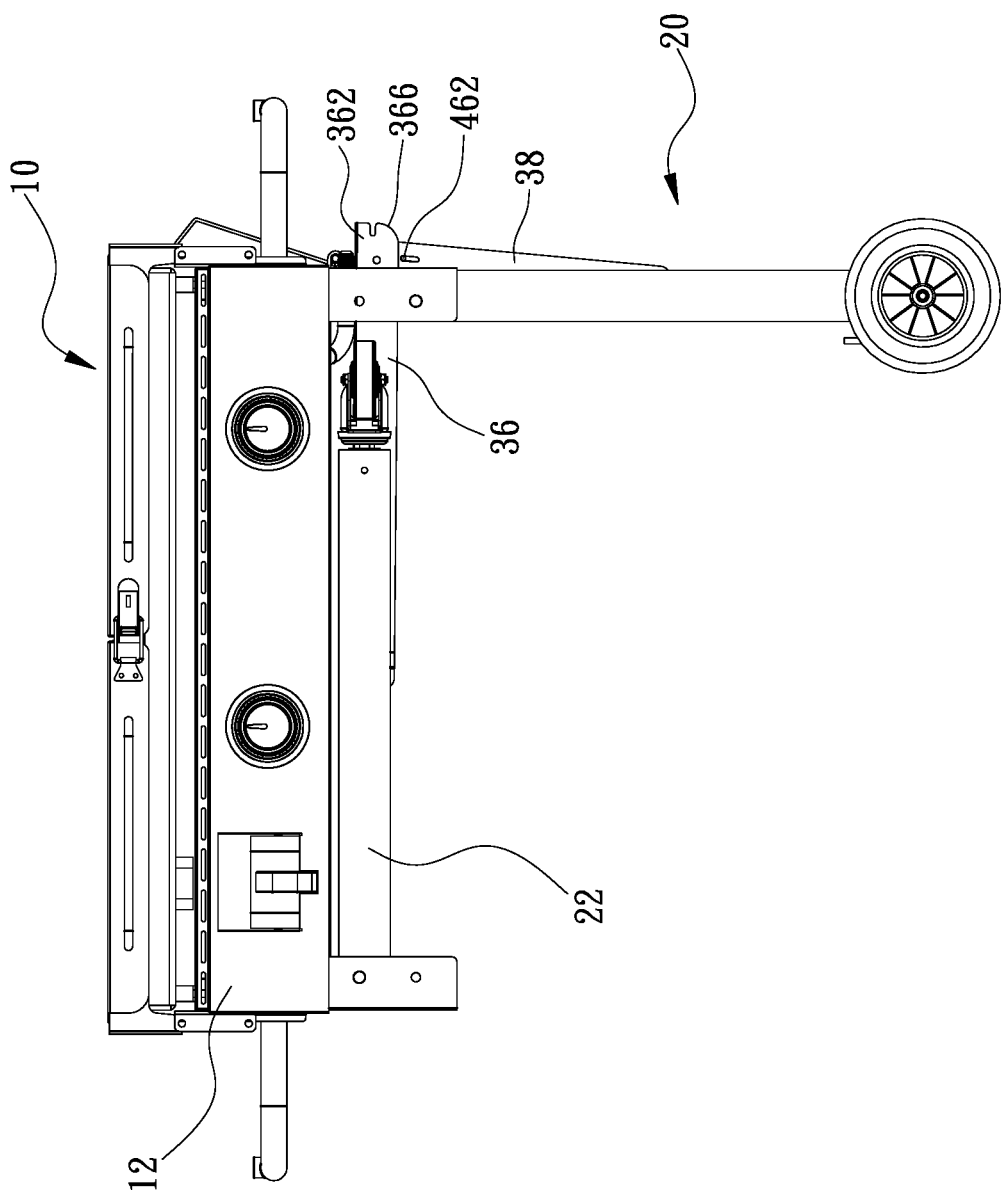
FIG. 12 is a cross-sectional view of the collapsible stand in another position than shown in FIG. 11.

The left levers 36 can be pivoted relative to the right levers 38 to move the linking device 30 to the extended position shown in FIG. 7 from the collapsed position shown in FIG. 9. Hence, the collapsible stand 20 can be moved to the extended position shown in FIG. 14 from the collapsed position shown in FIG. 10 via other positions shown in FIGS. 11 to 13 sequentially. In this movement, the tongue 462 is moved into the straight slit 363 from the arched slit 364 via and along the edge 366. The tongue 462 is kept in the straight slit 363 as the spring 56 is compressed between the annular rib 461 and the supporting arched portion 441. Thus, the left levers 36 cannot be pivoted relative to the right levers 38, i.e., the linking device 30 is kept in the extended position, and so is the collapsible stand 20.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A collapsible stand comprising
a box;
four connectors connected to a lower portion of the box;
two left legs pivotally connected to two of the connectors;
two right legs pivotally connected to remaining ones of the connectors, wherein each of the left legs is located between one of the right legs and the box when the collapsible stand is in a collapsed position;
two left levers each of which comprises an end pivotally connected to one of the left legs, wherein at least one of the left levers comprises a straight slit and an arched slit in another end;
two right levers each of which comprises an end pivotally connected to one of the right legs, wherein at least one of the right levers comprises a slot in another end;
at least one lock device comprises a rod transversely formed with a tongue movable along the slot, wherein the right and left levers are kept in an extended position when the tongue is inserted in the straight slit, and the right and left levers are kept in a collapsed position when the tongue is inserted in the arched slit.

2. The collapsible stand according to claim 1, further comprising two left pivots each of which is inserted in a corresponding one of the connectors and a corresponding one of the left legs and two right pivots each of which is inserted in a corresponding one of the connectors and a corresponding one of the right leg.

3. The collapsible stand according to claim 2, where the left pivots are located closer to the box than the right pivots.

4. The collapsible stand according to claim 1, further comprising two casters each of which is connected to a corresponding one of the left legs.

5. The collapsible stand according to claim 1, further comprising two wheels each of which is connected to a corresponding one of the right legs.

6. The collapsible stand according to claim 1, further comprising a left board connected to the left levers so that they are movable together and a right board connected to the right levers so that they are movable together.

7. The collapsible stand according to claim 1, wherein each of the right levers comprises a contact portion, and each of the left levers comprises a restraining portion for abutment against the contact portion of a corresponding one of the right levers to avoid over-pivoting of the right levers relative to the left levers.

8. The collapsible stand according to claim 1, wherein the lock device further comprises a primary plate connected to the corresponding right lever and a secondary plate connected to the primary plate, wherein rod is located between the primary plate and the secondary plate.

9. The collapsible stand according to claim 8, wherein the secondary plate comprises two arched portions connected to the primary plate, wherein the rod is located between the primary plate and the arched portions of the secondary plate.

10. The collapsible stand according to claim 9, wherein the rod comprises an annular rib formed thereon, and the lock device further comprises a spring located on the rod and compressed between the annular rib of the rod and one of the arched portions of the secondary plate, thereby biasing the tongue from the remaining one of the arched portions of the secondary plate.

11. The collapsible stand according to claim 10, wherein the rod further comprises a handle transversely extending from an end.

12. The collapsible stand according to claim 1, further comprising a latch device operable for locking the left legs to the right legs.

13. The collapsible stand according to claim 12, wherein the latch device comprises a pin movably connected to the right legs and formed with an insert for insertion in an aperture in one of the left legs.

14. The collapsible stand according to claim 13, further comprising a crossbar located between and connected to the right legs, wherein the pin is movably connected to the crossbar.

15. The collapsible stand according to claim 14, wherein the latch device further comprises a plate connected to the crossbar and formed with two loops for receiving the pin.

16. The collapsible stand according to claim 14, wherein the latch device further comprises a clip connected to the pin and a spring located on the pin and compressed between the clip and one of the loops, thereby biasing the insert from the remaining one of the loops.

17. The collapsible stand according to claim 16, wherein the pin further comprises a handle transversely extending from an end.

* * * * *